(12) United States Patent
Reid et al.

(10) Patent No.: US 6,248,982 B1
(45) Date of Patent: Jun. 19, 2001

(54) COOKING SINK

(75) Inventors: Mary J. Reid; David J. O'Connell, both of Sheboygan; Carl F. Mueller, Sheboygan Falls; John F. Quella; Mark Johansen, both of Kohler, all of WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 09/537,278

(22) Filed: Mar. 29, 2000

Related U.S. Application Data

(60) Provisional application No. 60/126,795, filed on Mar. 30, 1999.

(51) Int. Cl.[7] .............. A47J 27/00; A47J 27/20; A47J 27/21
(52) U.S. Cl. ............ 219/429; 219/432; 219/433; 99/357; 99/403
(58) Field of Search ................... 219/415, 429, 219/432, 438; 99/359, 403

(56) References Cited

U.S. PATENT DOCUMENTS

| | | | |
|---|---|---|---|
| 1,496,956 | * 6/1924 | Walker . | |
| 2,202,320 | * 5/1940 | Sacerdote | 53/11 |
| 2,217,804 | * 10/1940 | McCormick | 219/415 |
| 2,527,566 | * 10/1950 | Miller | 219/418 |
| 2,758,588 | * 8/1956 | Lozano | 126/1 |
| 3,402,406 | * 9/1968 | Kaiser | 4/192 |
| 3,627,396 | 12/1971 | Miller | 312/229 |
| 3,915,529 | 10/1975 | Bernier | 312/237 |
| 3,941,043 | * 3/1976 | Cerola et al. | 99/339 |
| 3,958,503 | * 5/1976 | Moore | 99/327 |
| 4,234,783 | * 11/1980 | Aoshima | 219/441 |
| 4,241,288 | * 12/1980 | Aoshima et al. | 219/441 |
| 4,250,959 | * 2/1981 | Spasojevic | 165/61 |
| 4,331,127 | * 5/1982 | Grosso | 126/61 |
| 4,336,620 | * 6/1982 | Gresh | 4/639 |
| 4,569,277 | * 2/1986 | Stiglich | 99/330 |
| 5,097,759 | * 3/1992 | Vilgrain et al. | 99/483 |
| 5,313,876 | * 5/1994 | Hilger et al. | 99/403 |
| 5,333,326 | * 8/1994 | Faries, Jr. et al. | 4/639 |
| 5,400,700 | * 3/1995 | Bois | 99/403 |
| 5,539,185 | * 7/1996 | Polster | 219/438 |
| 5,603,220 | * 2/1997 | Seaman | 62/3.7 |
| 5,842,353 | * 12/1998 | Kuo-Liang | 62/190 |

OTHER PUBLICATIONS

Three pages of a Gaggenau Ad, admitted prior art, showing a built–in steamer.*

One page of Pantry / Herb Spültischkombination Ad, admitted prior art, showing a cooking sink.*

* cited by examiner

*Primary Examiner*—Joseph Pelham
(74) *Attorney, Agent, or Firm*—Quarles & Brady LLP

(57) ABSTRACT

A cooking unit has a cooking chamber for water which is heated and drained from a pot by electrical remote controls which are compactly placed on the surface of the unit. In one embodiment, a basin is employed with the cooking unit and affords movement of a cutting board over the basin. Various types of cooking utensils can be employed in conjunction with the cooking chamber and the basin.

5 Claims, 6 Drawing Sheets

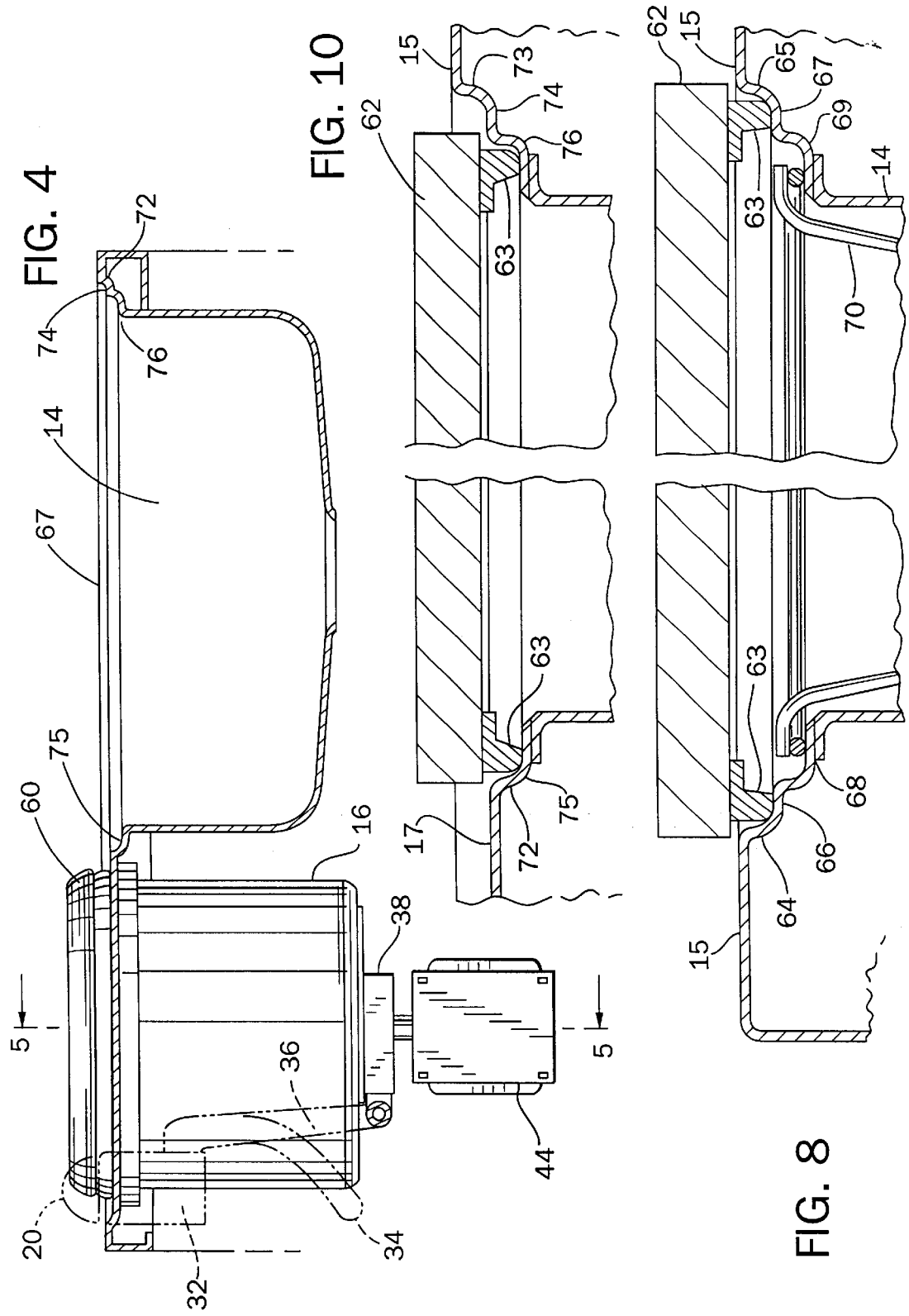

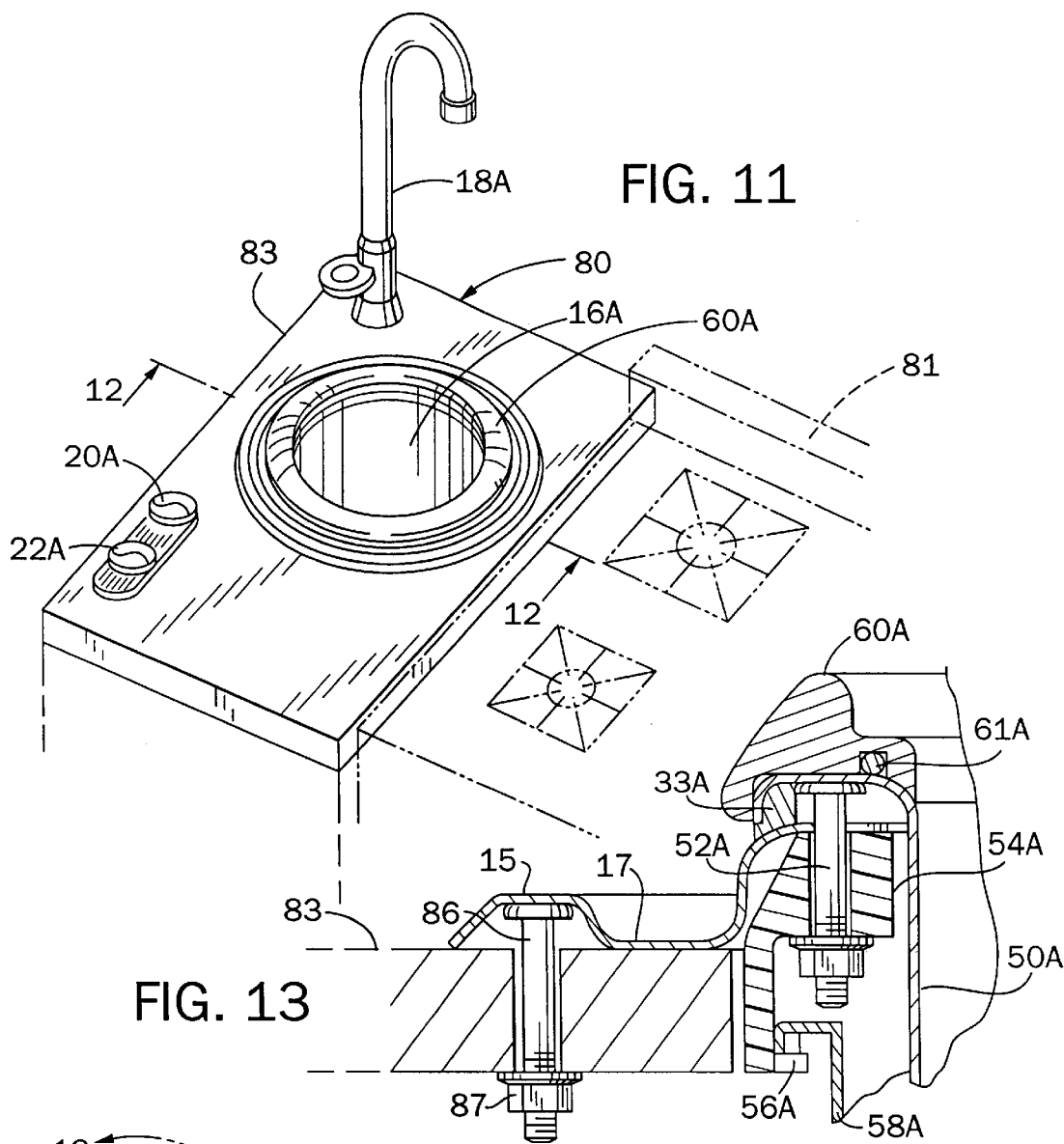
FIG. 11
FIG. 13
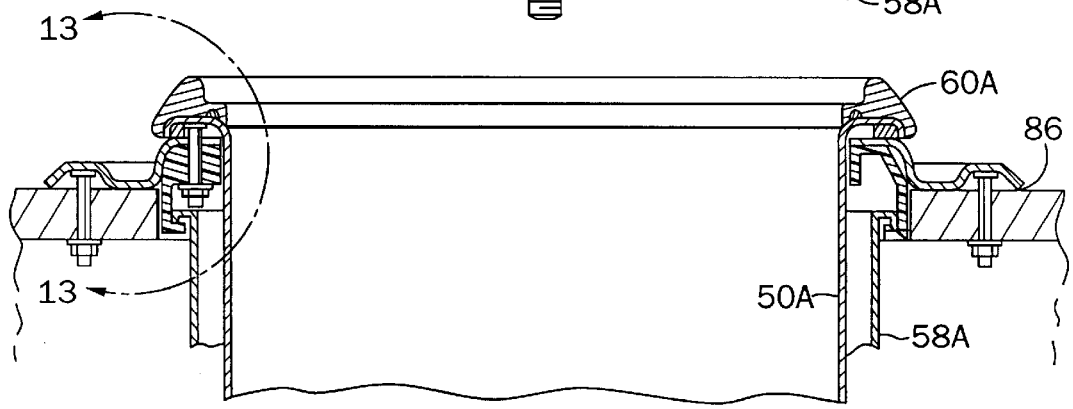
FIG. 12

COOKING SINK

CROSS-REFERENCE TO RELATED APPLICATIONS

This application is a continuation of a provisional application Ser. No. 60/126,795, filed Mar. 30, 1999.

STATEMENT REGARDING FEDERALLY SPONSORED RESEARCH OR DEVELOPMENT

Not applicable.

BACKGROUND OF THE INVENTION

The present invention relates to sinks which can provide a cooking capability. More particularly, it relates to cooking sinks with improved control features that are compactly arranged.

It is known to provide sinks with cooking capabilities such as a hot plate placed adjacent to a sink basin. It is also known to provide a kitchen counter top with a section that receives a built-in steamer with a drain that is connectable to kitchen plumbing.

Although the prior art teaches various types of sinks with basins and cooking capabilities, there is not currently available a kitchen sink with a cooking chamber wherein the controls are conveniently and compactly positioned.

BRIEF SUMMARY OF THE INVENTION

In one aspect the invention provides a combined sink and cooking unit including a sink having a top portion with a basin and a cooking chamber adjacent to each other, both of which have a lower drain outlet. A heating element is connected adjacent the bottom of the cooking chamber. A drain valve member is connected to the drain outlet of the cooking chamber. Drain valve and heating element controls are positioned on the top portion of the sink.

In another aspect, a faucet is mounted on the top portion of the sink and is constructed and arranged to provide water to both the basin and the cooking unit, and the drain valve, of the cooking chamber, is electrically activated.

In yet another aspect, the invention provides a cooking unit having a top portion with a cooking chamber positioned therein, the cooking chamber having a drain outlet. A heating element is connected adjacent to the bottom exterior of the cooking chamber. A drain valve member is connected to the drain outlet. Controls for the drain valve member and heating element are positioned on the top portion of the sink.

The advantages of the invention therefore include:

a. providing a cooking chamber (or combined sink and cooking unit) which facilitates the cooking of food;

b. providing a combined sink and cooking unit of the foregoing type wherein the heating of water and the draining thereof is easily controlled; and c. providing a combined sink and cooking unit of the foregoing type which is utilized in conjunction with a basin which facilitates the preparation of food.

These and still other objects and advantages of the invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 4 is a sectional view taken along line 4—4 of FIG. 1;

FIG. 8 is a sectional view taken along line 8—8 of FIG. 7;

FIG. 10 is a sectional view taken along line 10—10 of FIG. 9;

FIG. 11 is a top perspective view of an alternative embodiment of a cooking unit;

FIG. 12 is a sectional view taken along line 12—12 of FIG. 11; and

FIG. 13 is an enlarged view taken along line 13—13 of FIG. 12.

DETAILED DESCRIPTION OF THE INVENTION

Figure 1:
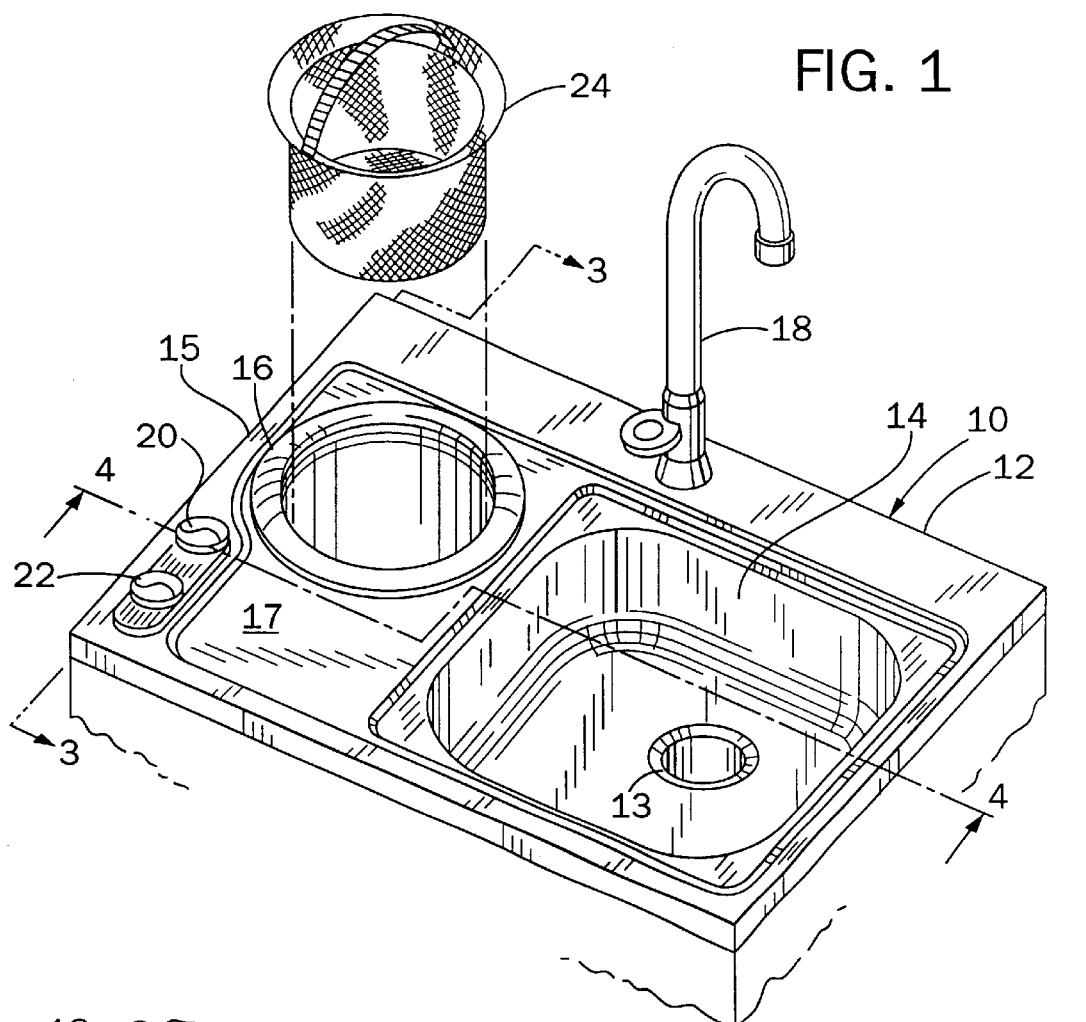
FIG. 1 is a top perspective view of the combined sink and cooking unit.
Figure 3:
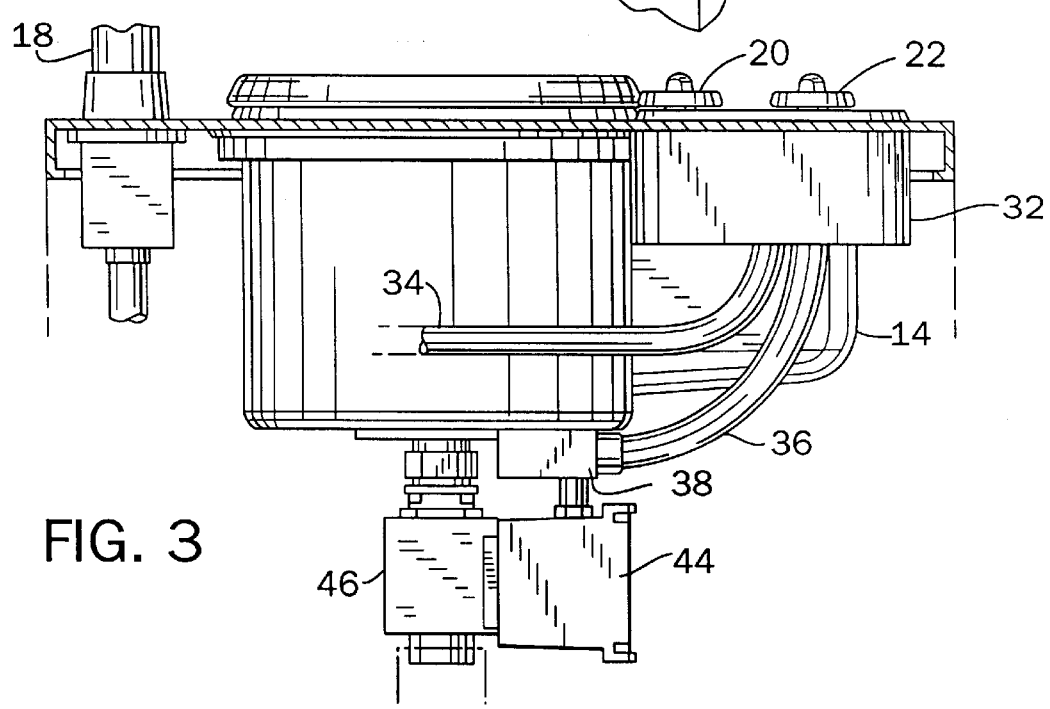
FIG. 3 is a side elevational view taken along line 3—3 of FIG. 1.
Figure 2:
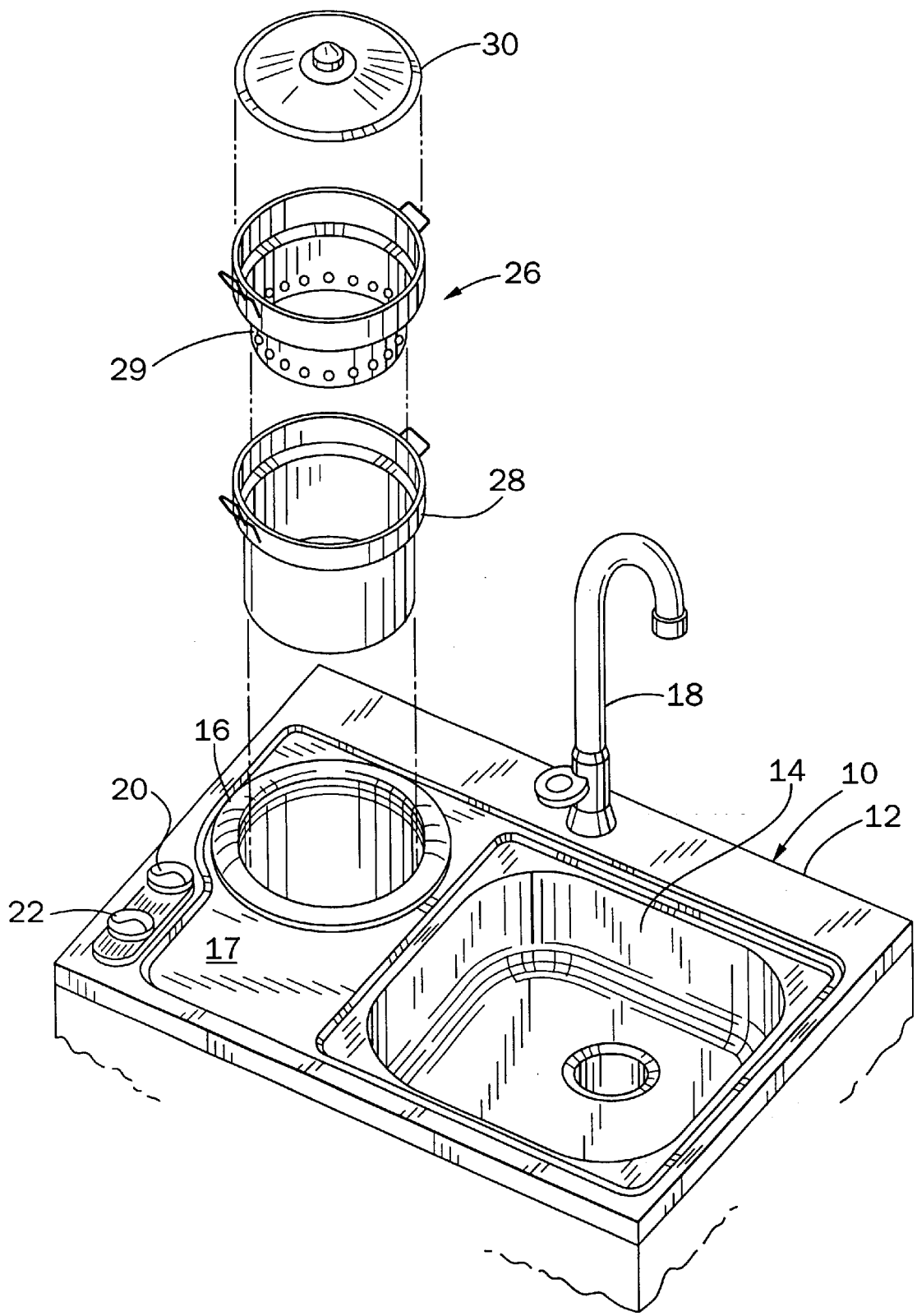
FIG. 2 is a view similar to FIG. 1 showing a different cooking utensil.

Referring to FIGS. 1–3, there is shown the combined sink and cooking unit, generally 10. It includes a sink 12 with a supporting top 15 in which are placed a basin 14 with a drain outlet 13 and a cooking chamber 16. The supporting top 15 has a recessed portion 17. A faucet 18 is provided to supply water to both the basin 14 and the cooking chamber 16. The cooking chamber 16 is designed to receive various types of cooking utensils, such as the wire basket 24 shown in FIG. 1 and the steamer 26 shown in FIG. 2 with the double boiler 28, the pasta colander 29, and the lid 30.

Placed adjacent to the cooking chamber 16 are the control knobs 20 and 22 for controlling electrical current for heating the cooking chamber, as well as opening and closing a drain thereto. This is seen in conjunction with FIGS. 3, 4 and 5. Electrical current is supplied by line 34 which is connected to control box 32. Current from this line will be regulated in the usual manner by switches housed in control box 32 and connected to control knobs 20 and 22. Line 36 is connected to junction box 38 and supplies controlled current to both the heating element 42 and the drain control 44 which controls a drain valve 46.

A housing 40 is provided over heating elements 42. Drain control 44 activates solenoid operated drain valve 46 for draining water from drain 48 and ultimately from the cooking pot 50 of the cooking chamber 16.

Figures 5, 6:
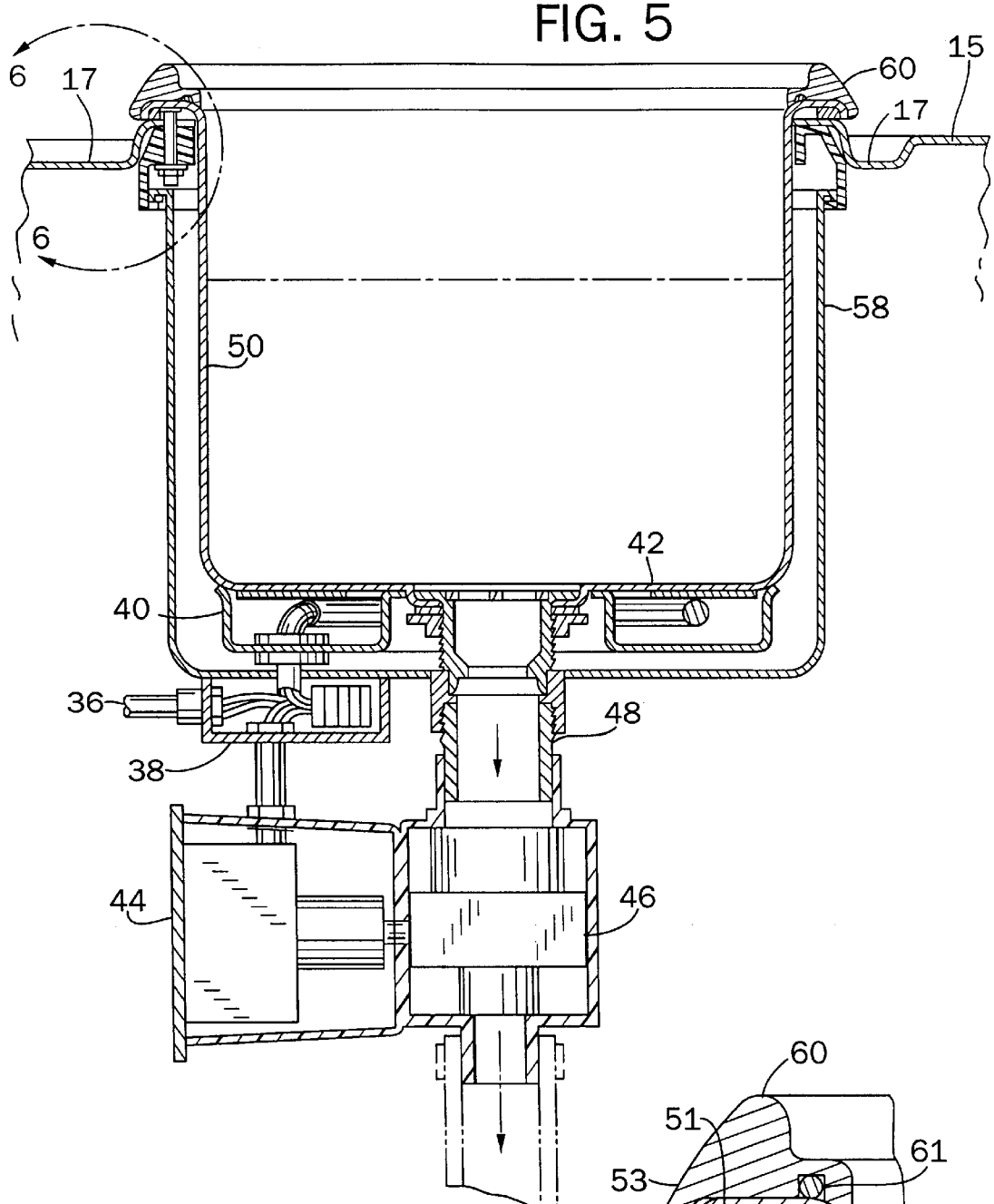
FIG. 5 is a sectional view taken along line 5—5 of FIG. 4.
FIG. 6 is an enlarged view taken along line 6—6 of FIG. 5.
Figure 9:
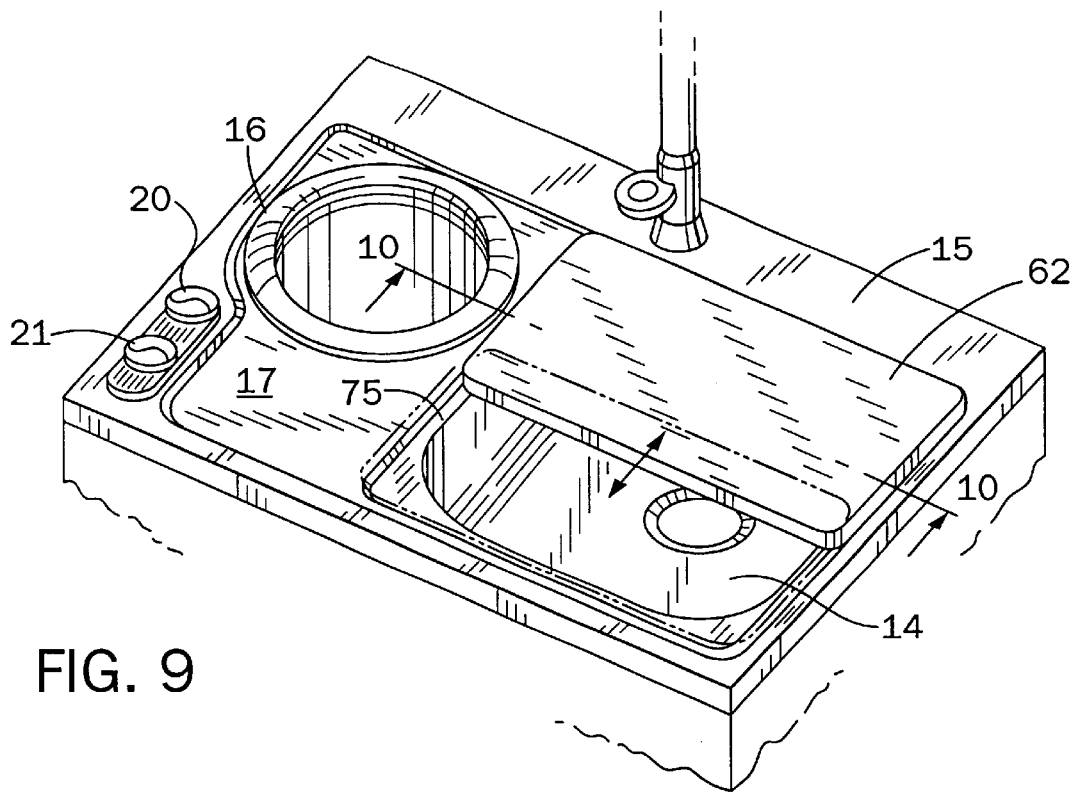
FIG. 9 is a view similar to FIG. 7 illustrating a different direction of movement of the cutting board.
Figure 7:
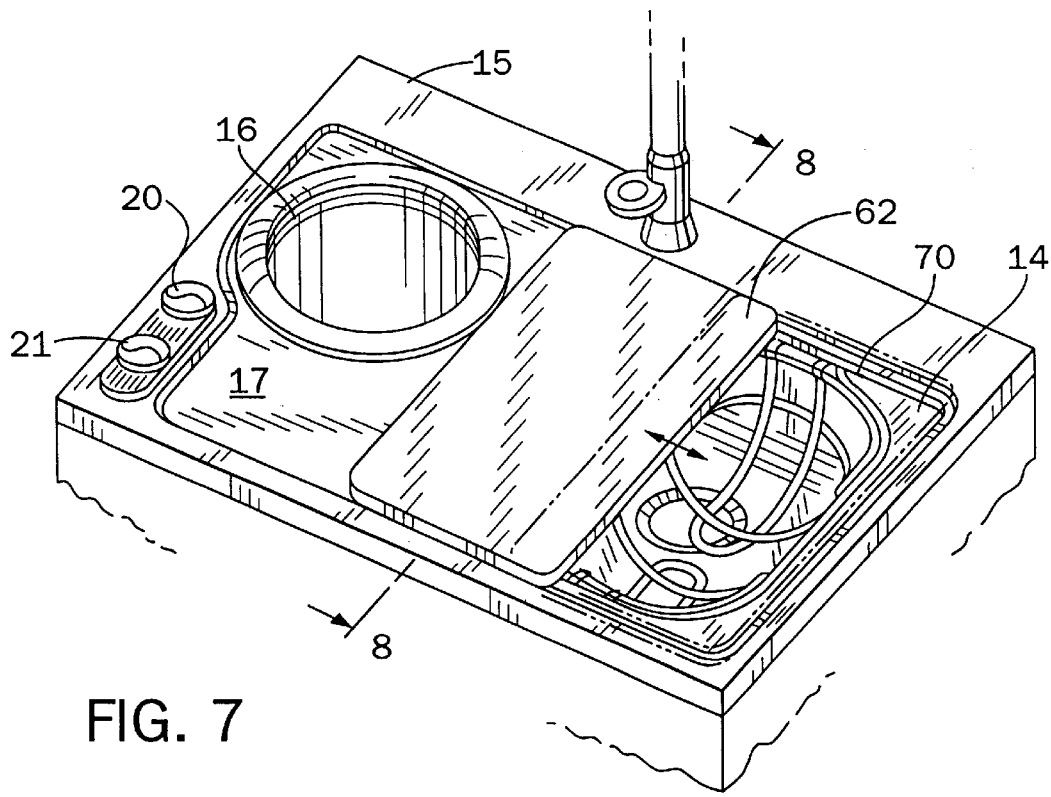
FIG. 7 is a top perspective view of the combined sink and cooking unit illustrating a cutting board and wire basket for use with the basin.

FIG. 6 illustrates the attachment of the cooking chamber 16 with pot 50 to the support top 17. A bolt 52 connected at its head to the shoulder 51 of the pot 50 is fastened to the connector 54 with the seal 53 placed between the shoulder 51 and the support top 17. Connector 54 has a support section 56 to which is connected an outer housing 58 for the cooking chamber. At the top of the cooking chamber is an insulating ring 60, the purpose of which is to prevent accidental contact with the top of the cooking pot which can be very hot. A seal 61 is disposed between the insulating ring 60 and the shoulder 51. Vents (not shown) are provided in the ring 60 to permit steam to escape when the chamber 16 is covered. They are preferably positioned at the back of the ring opposite the operator.

Referring to FIGS. 7–10, with respect to a particularly preferred embodiment, there is a cutting board 62 for movement in either a side-to-side manner or front-to back manner with respect to basin 14. As seen in FIG. 8, support top 15 includes a front wall 64 and a back wall 65 with supporting surfaces provided by upper tracks or rails 66 and 67, as well as lower rails 68 and 69. Placed in upper rails 66 and 67 are the support feet 63 of cutting board 62. This affords side-to-side slidable movement in these rails and over the wire basket 70 which is supported in the lower rails 68 and 69. If it is desired to have a front-to-back movement of the cutting board rather than a side-to-side movement, this is accomplished by removing the wire basket 70, turning the cutting board 62 90° with placement in the lower supporting surfaces provided by rails 75 and 76 which are provided in the side walls 72 and 73. This is shown in FIG. 10. It should be noted that side wall 73 also provides for an upper rail 74 which is coplanar with recessed surface 17. In effect, upper rails 66, 67 and 74 form a supporting surface or track with the recessed surface 17.

Referring to FIGS. 11–13, there is shown an alternative embodiment of a cooking unit, generally 80, without the basin and sink but in conjunction with a cooking range 81. This cooking unit includes all of the components previously described for cooking chamber 16 with similar components designated with the same numbers except followed by the suffix "A". The connection of the cooking chamber to a support is similar to that as previously described with the cooking chamber 16 except that the connection to the recessed surface 17 of the support top 15 includes an additional bolt 86 and nut 87 for connection through the counter top 83. The heating of water in the cooking chamber 16 as controlled by the control knob 20A, as well as the draining of water therefrom by means of the control knob 22A, is as previously described in conjunction with controls knobs 20 and 22.

An important feature of the combined sink and cooking unit 10, as well as that of unit 80, is seen from the fact that the control of heat and drainage is made convenient by the positioning of the control knobs such as 20 and 22 immediately adjacent to the cooking chamber. With the faucet 18 being placed adjacent thereto, the cooking chamber can be filled with water, heated and drained therefrom without having to remove the cooking utensil and the food prepared therein from the cooking pot until it is cooked.

While the cooking chamber 16 and its adjacent controls have been shown in conjunction with a sink basin as can be seen from the FIG. 11 embodiment, it can utilized without it and in conjunction with a cooking range. While the insulating ring 60 provides a safety feature, it could be eliminated and still have the advantages of the control feature. However, it is not recommended from a safety standpoint.

Industrial Applicability

The invention provides equipment useful in the kitchen in connection with cleaning and cooking foods, and processing and cleaning results thereof.

We claim:

1. A combined sink and cooking unit, comprising:
   a sink having a top portion with a basin and a cooking chamber positioned adjacent to each other, both of which having a lower drain outlet;
   a heating element positioned adjacent a lower exterior portion of the cooking chamber;
   a drain valve member connected to the drain outlet of the cooking chamber; and
   a control positioned on the top portion of the sink which can control both the drain valve and heating element.

2. The combined sink and cooking unit as defined in claim 1, further including a faucet mounted on the top portion of the sink constructed and arranged so as to be able to provide water to both the basin and the cooking chamber.

3. The combined sink and cooking unit as defined in claim 1, wherein the drain valve is electrically activated by the control.

4. A cooking unit assembly, comprising:
   a top portion with a cooking chamber positioned therein, the cooking chamber having a drain outlet and an upper shoulder;
   an insulating ring positioned over the shoulder with venting means positioned adjacent the rear of the insulating ring;
   a heating element connected to a lower exterior portion of the cooking chamber;
   a drain valve member connected to the drain outlet; and
   drain valve and heating element controls positioned on the top portion adjacent a front portion of the top portion.

5. The cooking unit assembly as defined in claim 4, further including a faucet mounted on the top portion for supplying water to the cooking chamber.

* * * * *